UNITED STATES PATENT OFFICE.

HEINRICH LAUBMANN, OF HÖCHST-ON-THE-MAIN, GERMANY, ASSIGNOR TO THE FARBWERKE, VORMALS MEISTER, LUCIUS & BRÜNING, OF SAME PLACE.

TETRANITRO-ANTHRACHRYSONE.

SPECIFICATION forming part of Letters Patent No. 511,901, dated January 2, 1894.

Application filed February 27, 1893. Serial No. 463,946. (Specimens.)

*To all whom it may concern:*

Be it known that I, HEINRICH LAUBMANN, a doctor of philosophy, and a subject of the Emperor of Germany, residing at Höchst-on-the-Main, in the Empire of Germany, have invented certain new and useful Improvements in the Production of Tetranitro-Anthrachrysone; and I do hereby declare the following to be a full, clear, and exact description of the invention, such as will enable others skilled in the art to which it appertains to make and use the same.

Anthrachrysone can be easily and quantitatively converted into a tetra-nitro-compound.

For nitrating the anthrachrysone, it is dissolved in about twelve times its weight of concentrated sulfuric acid and while cooling it is caused to flow slowly into the quantity of nitric acid calculated, for four nitro-groups. As the nitration proceeds the nitro-product separates in the form of a yellow crystalline mass. To insure that the entire quantity of anthrachrysone is converted into the nitro-compound, near the end of the operation the entire mass is heated to about 80° centigrade. After having cooled down it is poured upon ice and diluted with such a quantity of water that the separated nitro-anthrachrysone remains undissolved in the diluted acid; it is separated from the acid by filtration.

In order to purify the crude product it is precipitated from its aqueous solution by means of concentrated hydrochloric acid and washed with somewhat diluted hydrochloric acid. The purified product has been found to contain 12.1 per cent. of nitrogen; the calculated quantity of nitrogen for the tetra-nitro-anthrachrysone being 12.4 per cent.

The tetra-nitro-anthrachrysone is easily soluble in the usual solvents except benzine, ligroine and chloroform. From its solution in pure glacial acetic acid it can be obtained by precipitation by means of chloroform in the form of very small crystals, which heated to from 280° to 300° centigrade decompose with detonation. With potassium, sodium and ammonium it forms salts insoluble in alcohol. The salts of the nitro-anthrachrysone detonate on being heated.

The tetra-nitro anthrachrysone dyes chromed wool strong brown shades, alumed wool strong claret-brown shades, which excel by great fastness in fulling and by luster. In these respects the tetra-nitro-anthrachrysone is superior to all the coloring matters of similar shade at present known.

What I claim as my invention is—

1. The process for the production of tetra-nitro-anthrachrysone by submitting anthrachrysone to the action of nitric acid, substantially as described.

2. As a new article of manufacture tetra-nitro anthrachrysone, derived from anthrachrysone and nitric acid, a yellow powder easily soluble in the usual solvents except benzene, ligroine and chloroform, from its pure glacial acetic acid solution precipitated by chloroform, in the form of very small crystals which heated to from 280° to 300° centigrade decompose under detonation; forming, with potassium, sodium and ammonium, salts insoluble in alcohol, detonating also on being heated.

In testimony whereof I affix my signature in presence of two witnesses.

HEINRICH LAUBMANN.

Witnesses:
EUGEN JOSEF REVENDY,
HEINRICH HAHN.